Sheet 1.-2 Sheets.

J. Goulding.
Wool Burring Mach

N°. 42,940.  Patented May 31, 1864.

Witnesses:
J Henry Hug
Geo H Miller

Inventor:
John Goulding
By his Attorney
Thomas H Dodge

J. Goulding.
Wool Burring Mach.
No. 42,940. Patented May 31, 1864.
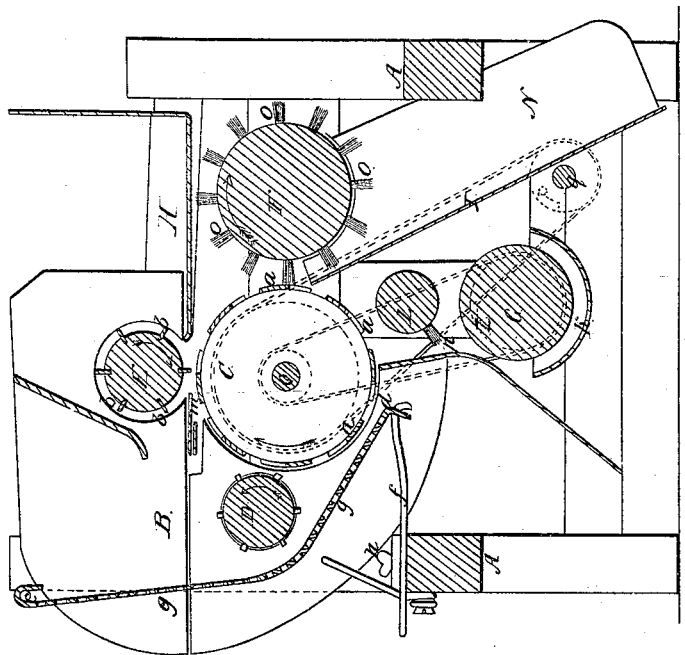
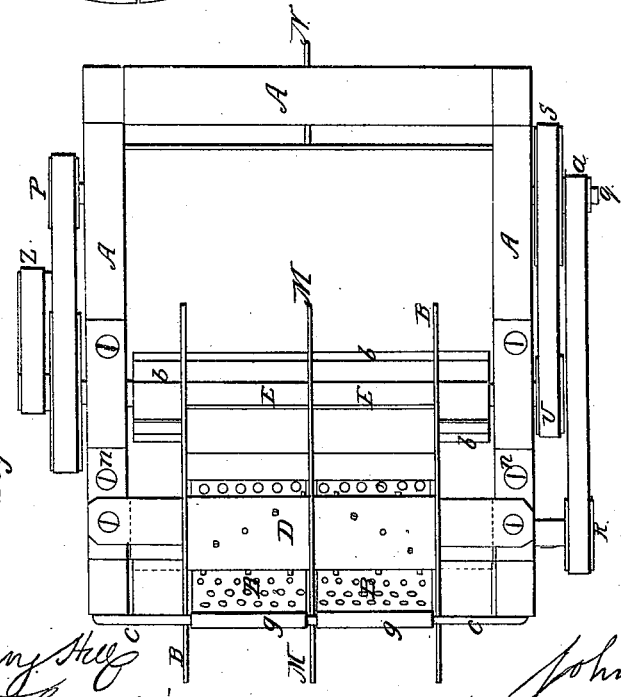

UNITED STATES PATENT OFFICE.

JOHN GOULDING, OF WORCESTER, MASSACHUSETTS.

IMPROVEMENT IN MACHINES FOR BURRING WOOL AND GINNING COTTON.

Specification forming part of Letters Patent No. 42,940, dated May 31, 1864.

*To all whom it may concern:*

Be it known that I, JOHN GOULDING, of Worcester, in the county of Worcester and State of Massachusetts, have invented certain new and useful Improvements in Machines for Burring Wool and Ginning Cotton; and I do hereby declare that the following is a full, clear, and exact description of the construction and operation of the same, reference being had to the accompanying drawings, in which—

Figure 4:
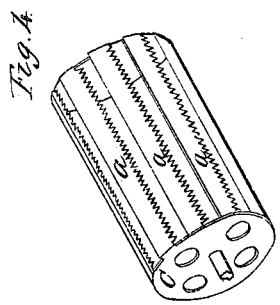
Figure 1:
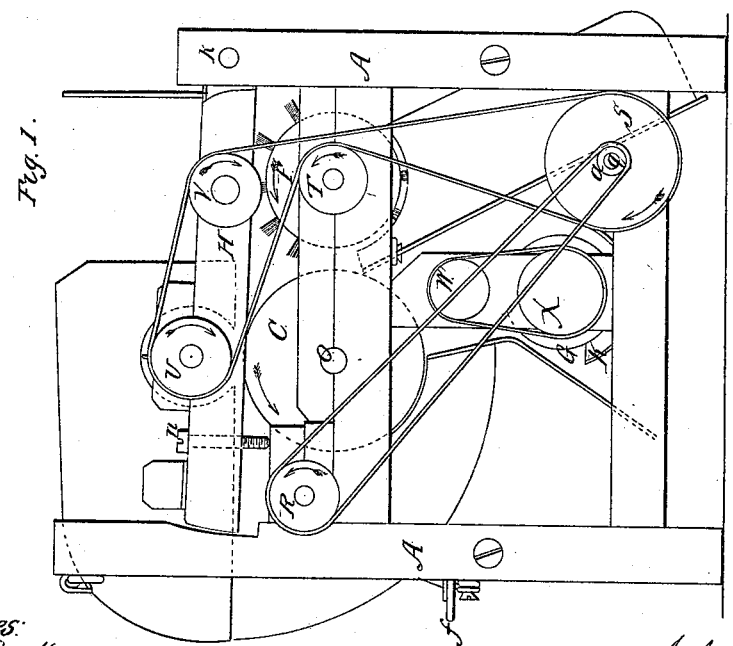

Figure 1 represents a side view of the machine. Fig. 2 represents a longitudinal vertical section through the same. Fig. 3 represents a top view of the machine. Fig. 4 represents a detached view, hereinafter to be referred to.

My invention relates to the combination of feeding, combing, and beating cylinders, by which I effect a thorough separation of burrs or seed from the material; also, in the combination of certain devices for oiling the combing-cylinder to prevent its clogging; also, to the application of one or more partitions in the hopper to operate on different staples simultaneously.

To enable others skilled in the art to make and use my invention, I will proceed to describe its construction and operation.

A represents the frame of the machine. B represents the hopper which receives the stock to be operated upon. C, represented in a perspective view at Fig. 4, represents the combing-cylinder. It is a hollow cylinder provided at its circumference with comb-slats $a$, which carry the wool or cotton up from the hopper, a space being left between each two consecutive combs to enable them to seize the material and to permit a free passage of the dust or other impurities to the inside of the cylinder, which would otherwise clog up the combs.

D represents a cylinder which revolves within the hopper B and stirs up the material and keeps it in a loose condition, so as to be readily seized by the combing-cylinder C.

E represents the burring-cylinder. It is provided with beaters $b$, which operate upon the stock while it is carried up by the combs of the cylinder C and beat off the burrs or seeds which are thrown back into the hopper B. The rear sides, $g$, of this hopper, which are perforated for the escape of the dust, are hung upon a cross-rod, $e$, and incline toward the cylinder C, having an aperture, $d$, at the bottom through which the seed or burrs can escape. The size of this aperture can be adjusted by means of the rods $f$, by which the lower ends of the screens $g$ can be moved to or from the cylinder C, and can be secured in their positions by means of clamp-screws $h$, or otherwise. Thus the size of the passage $d$ is adjusted to insure a perfect operation of the machine according to the material to be acted upon.

$m$ represents a spring-plate within the hopper B, which presses the material toward the combing-cylinder C, and thus causes the combs to take hold of the wool or cotton. The burring-cylinder E and the spring-plate $m$ are both secured to the adjustable frame H, which is pivoted at $k$ to the main frame, and the position of which can be adjusted by means of the set-screws $n$. Thus the pressure of the spring-plate $m$, as well as the action of the burring-cylinder E, can be adjusted with great accuracy.

F represents the stripping cylinder. It is provided with brushes $o$ on its circumference, which strip the combs $a$ of the stock after the burrs or seeds have been beaten off by the cylinder E, and the material drops down on the partition I.

It has been found by experience that the combs $a$ on the cylinder C have a tendency to clog and become useless owing to the fibers and dust adhering to them, they not being effectually stripped by the stripping-cylinder F. To facilitate this operation, it has been found advantageous to lubricate them with oil or grease, and for this purpose I use the following arrangement:

G represents a cylinder which revolves within a trough, K, which contains oil or other fatty substance.

L represents another cylinder which is provided with one row or set of bristles, $p$, which in revolving can touch the circumference of the cylinders G and C, and when the cylinders revolve with the proper velocity the bristles $p$ transfer the desired quantity of oil from the circumference of the cylinder G to the combs $a$.

The operation of the machines is as follows: The cylinders and belting run in the direction of the arrows represented on the drawings. Motion being given to the shaft O of the cylinder C, it is communicated by belt to the pulley P of shaft $q$, and the pulley Q on said shaft turns by means of a belt the pulley R of roller D. The pulley S on shaft $q$ turns the pulley T of stripper F and pulley U of the burr-cylinder E, the belt passing over the guide pulley $r$ on the adjustable frame H. The cylinder D runs slower than cylinder C. Burr-cylinder E runs faster than C, and so does the stripper F. The speed of the cylinder L and G must be regulated according to the material to be worked, whereby the combs $a$ may require more or less oiling. Cylinders L and G are operated by means of pulleys W and X, which receive their motion from pulley Z.

M represents a partition by which the hopper is divided in two compartments. A similar division or partition, N, is secured to the shield I. By means of these divisions I am enabled to operate on different staples simultaneously, as the aperture $d$ of each screen $g$ can be adjusted independently of the other, according to the material to be operated upon.

The front part of the spring-plate $m$ is cut in the form of elongated teeth, and said teeth are so shaped that each of them can spring up and down independently of the other, so as to yield should an uneven pressure be exerted upon them.

Having thus fully described the nature of my invention, what I claim herein as new, and desire to secure by Letters Patent, is—

1. The combination of the cylinders C and E with the oiling-cylinders L and G, substantially in the manner and for the purpose described.

2. The combination of the cylinders D C E F, spring-plate $m$, and adjustable hopper-plates $g$, substantially in the manner and for the purpose described.

3. In combination with the adjustable hopper-plates $g$, the partitions M N, substantially in the manner and for the purpose described.

JOHN GOULDING.

Witnesses:
  THOMAS H. DODGE,
  J. HENRY HILL.